3,814,811
METHOD OF ELIMINATING OR ALLEVIATING LOCAL PAIN WITH DIETHYLAMINOETHYL FLUFENAMATE
Francisco Javier Andreu Batllo and Juan Antonio Andreu Bufill, Barcelona, Spain, assignors to Doctor Andreu, S.A., Barcelona, Spain
Filed June 7, 1972, Ser. No. 260,485
Int. Cl. A61k 27/00
U.S. Cl. 424—309
4 Claims

ABSTRACT OF THE DISCLOSURE

The present invention relates to a novel method for treating a mammalian body afflicted with local pain. This method is effected by applying topically to the affected site diethylaminoethyl flufenamate or one of its salts.

FIELD OF THE INVENTION

The present invention relates to a novel method and, more particularly, this invention relates to a novel method for treating mammalian bodies afflicted with local pain. This method is effected by applying topically to the affected sites diethylaminoethyl flufenamate or one of its salts.

Outstanding among synthetic products having a local anaesthetiizng effect are several derivatives of para-aminobenzoic acid (benzocaine, procaine, tertacaine, etc.), some meta-aminobenzoic acid derivatives (new orthoform), certain aromatic base amides (lidocaine and the like) and even benzoic acid esters (piperocaine). On the other hand, ortho-aminobenzoic, or anthranilic, acid derivatives are not cited.

Some derivatives of this last named acid, such as N-(m-trifluoromethylphenyl) anthranilic, or flufenamic acid and others, have an anti-inflammatory activity when administered systemically. But this flufenamic acid or its salts, when applied topically, caused local irritation.

Other derivatives of flufenamic acid, including its esters, have been cited as having a general activity of the same type as that of the acid itself, but there are no references as to their topical activity.

We have found surprisingly that when applied topically to the skin or mucous membranes, diethylaminoethyl flufenamate or its salts do not cause the irritation that flufenamic acid and its salts do and that, on the contrary, they have a definite intense local anaesthetizing effect.

Accordingly a primary object of this invention is to provide a novel method for the treatment of local pain by the application of diethylaminoethyl flufenamate.

BRIEF DESCRIPTION OF THE DRAWINGS

For further understanding of the invention, reference may be had to the attached figures in which.

DETAILED DESCRIPTION

Figure 1:
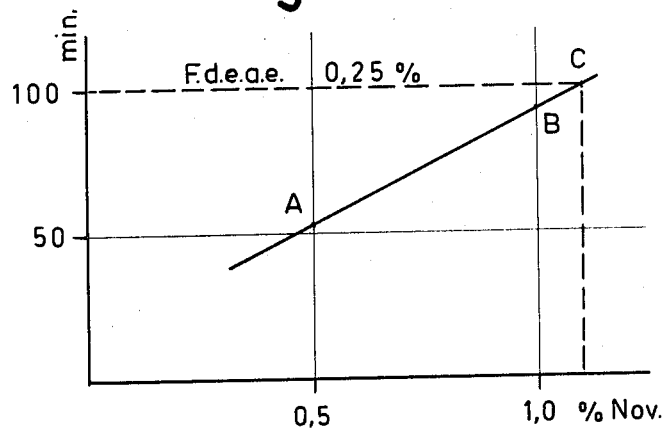
FIG. 1 shows comparatively the anaesthetizing effect, according to Sollman's technique, using 0.5% and 1.0% solutions of novocaine and a 0.25% solution of diethylaminoethyl flufenamate and rabbit's cornea.

The six tests described hereinafter have enabled us to corroborate and confirm our observation that diethylaminoethyl flufenamate does not cause local irritation.

(1) Using a test lot of 16 rabbits, drops of diethylaminoethyl flufenamate were placed in the conjunctive of the eye, the following results being observed:
with a 0.25% solution: no local reaction
with a 0.5% solution: formation of a precipitate which, if removed, produced no local reaction
with a 1.0% solution: formation of a precipitate which, if removed, produced no local reaction
with a 1.5% solution: caused conjunctivitis in some rabbits lasting 3–4 days.

(2) Six rats were given a subcutaneous abdominal injection of 0.2 ml. of a 13% solution of diethylaminoethyl flufenamate which produced only slight traces of local irritation (observation made at 24 hours after administration).

(3) Six rats were given a rectal administration of 1 ml. of a 0.1% solution of diethylaminoethyl flufenamate for three consecutive days which produced no irritation of the rectal mucous membrane (observation at 24 hours after the last administration).

(4) Six rats were treated for three consecutive days with a spray of a 0.5% diethylaminoethyl flufenamate solution on the pharyngeal mucous membrane, there being no irritation of the mucous membrane (observation at 24 hours after the last application).

(5) Six rats were treated in the rectum for three consecutive days with an ointment containing 1% of diethylaminoethyl flufenamate which caused no irritation (observation at 24 hours after the last application).

(6) Four rabbits were treated with an ointment containing 1% of diethyaminoethyl flufenamate in the conjunctiva, no local irritation occurring (observation at 48 hours after application).

The form of the diethylaminoethyl flufenamate used in the foregoing experiments, as also in the examples to be described hereinafter, is the hydrochloride which is a more manageable form having better water solubility than the unsalified ester.

Broadly speaking, the practice of this invention is effected by dissolving from 0.2–5% of diethylaminoethyl flufenamate hydrochloride in water or by incorporating a like concentration into a base for a cream or ointment, and by applying this composition several times daily to the area where the local anaesthetizing is required.

In order to broaden and enhance the therapeutic spectrum of this invention, the above described compositions may optionally contain other therapeutic agents, for example, antibiotics and/or corticosteroids when it is wanted to mitigate the pain caused by a local infection or inflammation.

The following examples are pharmacological tests of the local anaesthetizing effect of diethylaminoethyl flufenamate and precise ways of performing the present invention.

EXAMPLE I

An 0.25% aqueous solution (0.25 gr./100 cc.) of diethylaminoethyl flufenamate (hydrochloride) was prepared and its anaesthetizing effect was compared on rabbit's cornea, according to Sollman's technique (J. Pharmacol., 11.1 (1918)), with that of 0.5% and 1% concentrations of procaine hydrochloride (novocaine).

With the above technique, the duration of the anaesthesia is 53 min. and 92 min., respectively, with the 0.5% and 1.0% solutions of novocaine, whilst it reaches 100 min. with the 0.25% solution of diethylaminoethyl flufenamate. This represents a 4.4 times greater anaesthetizing effect for the diethylaminoethyl flufenamate.

This test has been drawn graphically in FIG. 1. The vertical axes gives the time in minutes and the horizontal axes the concentrations of the aqueous solutions in grams/100 cc.

With a 0.5% (0.5 g./100 cc.) solution of novocaine, the anaesthetizing effect lasted for 53 minutes (point A) whilst with the 1% solution the anaesthetizing effects lasted 92 minutes (point B).

In the graph, it is seen that if the straight line joining these two points A and B is continued upwardly to point C, at the 100 minute level on the axis of ordinates, corresponding to the duration of the anaesthetizing effect of a 0.25% solution of diethylaminoethyl flufenamate, the reading on the axis of abscissae corresponds to a concentration of 1.1% of novocaine. This means that the anaesthetizing effect of the diethylaminoethyl flufenamate is 4.4 times greater than that of novocaine.

EXAMPLE II

A 0.5% aqueous solution (0.5 g./100 cc.) of diethylaminoethyl flufenamate was prepared and its anaesthetizing effect when administered subcutaneously in the dorsum of the cavy, according to Bulbring and Wajda's technique (J. Pharmacolog., 85, 78 (1945)) was compared with 0.5%, 1.0% and 2.0% novocaine solutions.

With the above technique, anaesthesia times of 10 min., 28 min. and 35 min., respectively, were obtained with the three novocaine solutions as compared with 61 min. with the 0.5% diethylaminoethyl flufenamate solution. This means that the anaesthetizing effect of diethylaminoethyl flufenamate is 6.0 times greater than that of novocaine.

Figure 2:
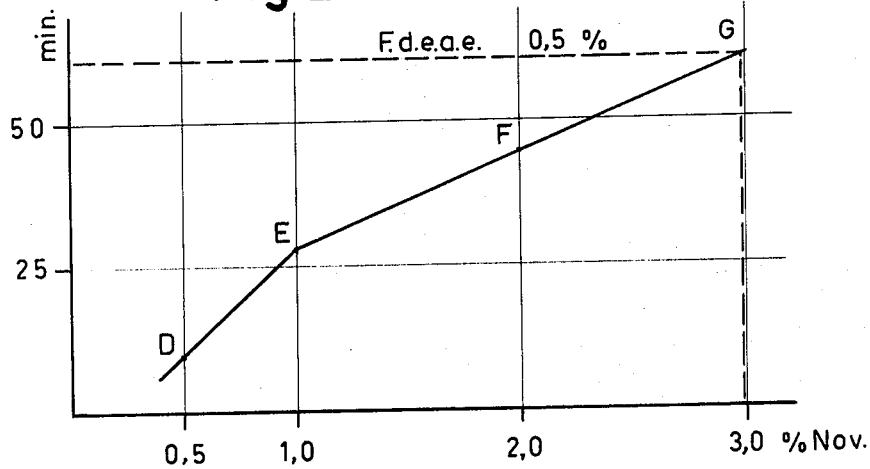
FIG. 2 shows comparatively the anaesthetizing effect, according to Bulbring and Wadja's technique, using 0.5%, 1.0% and 2.0% solutions of novocaine and a 0.5% solution of diethylaminoethyl flufenamate on the dorsum of the cavy.

FIG. 2 is the graph of the test performed with this technique. Points D, E and F are plotted for 0.5%, 1.0% and 2.0% novocaine solutions, against their respective anaesthetizing times of 10, 28 and 35 minutes. If the straight line EF is projected beyond F, it is observed that at point G it reaches the 61 minute level on the axis of ordinates, corresponding to the anaesthetizing effect of a 0.5% solution of diethylaminoethyl flufenamate. The reading on the axis of abscissae corresponding to point G shows a 3% concentration of novocaine. This means a concentration 6 times higher than that of the diethylaminoethyl flufenamate to produce the same effect. That is, the anaesthetizing effect of the diethylaminoethyl flufenamate is 6 times greater than that of novocaine.

As may be observed, the most unfavorable case has been taken since, in view of the law of variation of slopes observed in line DEF, it may be assumed that if a test were performed with a 3% concentration of novocaine, point G would be rather lower.

EXAMPLE III

In order to compare the local anaesthetizing effect, a technique similar to that described by Woolfe and McDonald (J. Pharmacol. 80, 300 (1944)) has been used in this example for evaluation of analgesics, adapting it as follows:

Adult mice having a weight of from 20 g. to 25 g. are placed on a hot plate thermostatically controlled to 55° C. These mice had previously been injected in the subplantar region with 0.05 cc. of the solutions to be tested. Determinations were made of the time delay of the response of treated mice with respect to mice injected with an equal volume of physiological saline solution.

Groups of 10 mice were used for each concentration. These concentrations were 0.50%, 0.75%, 1% and 2.0% for the diethylaminoethyl flufenamate and 0.75%, 1.0% and 2.0% for the novocaine.

Figure 3:
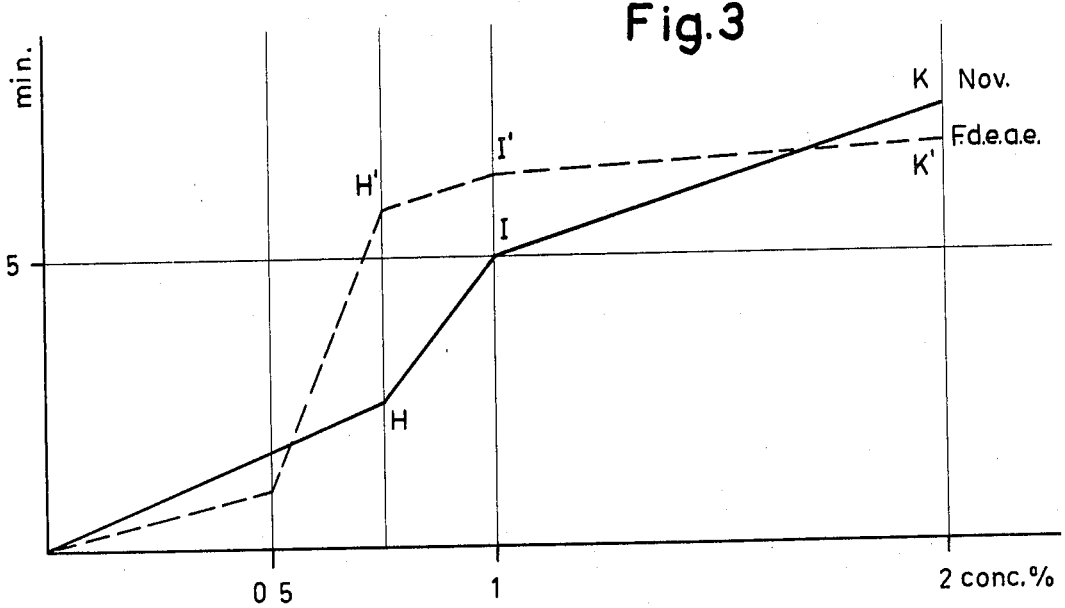
FIG. 3 shows comparatively the effect of equal solutions of novocaine and diethylaminoethyl flufenamate using the modified Woolfe and McDonald's technique for the evaluation of analgesics.

The solid line in FIG. 3 shows the behaviour of the novocaine and the dash line the behaviour of the diethylaminoethyl flufenamate. It is observed that the diethylaminoethyl flufenamate showed a greater anaesthetizing effect at the intermediate concentrations. At a concentration of 0.75% (point H'), the effect of the diethylaminoethyl flufenamate was twice that of the novocaine (point H) and at a concentration of 1%, the effect of the diethylaminoethyl flufenamate (point I') is 1.3 times that of novocaine (point I). Nevertheless, at concentrations of 2%, the effect of the novocaine is slightly superior (points K', K).

EXAMPLE IV

The depressant action on the spontaneous motility of isolated rabbit's intestine, in the Magnus preparation (Pflugers Arch. Ges. Physiol., 102, 123 (1904)), was compared. Diethylaminoethyl flufenamate produced a relaxation and atony of the unstriated muscular fibre at a concentration of 25 mcg./cc. comparable to that produced by novocaine at a concentration of 100 mcg./cc. The data are the average of four experiments. In this text, therefore, the diethylaminoethyl flufenamate shows an activity 4 times greater than novocaine.

EXAMPLE V

Elio and Stephenson (Brit. J. Pharmacol., 3, 108 (1948) and 3, 237 (1948)) have observed a parallelism between the local anaesthetizing effect of various drugs and their capacity to inhibit the contraction response of the rectus abdominis of the frog to acetylcholine. Using Burn's technique (Practical Pharmacology, Oxford, Blackwell (1952)) and stimulating the contraction of said rectus abdominis with 5 mcg. of acetylchlorine, the reduction of the contractions has been determined when solutions of novocaine, in some tests, and of diethylaminoethyl flufenamate, in other tests, were added previously to the organ baths (Ringer solution).

In the first tests, the inhibition of the response of the rectus abdominis of the frog was recorded when there is added to the organ bath, as well as the 5 mcg./cc. of acetylcholine, 100 mcg./cc. of novocaine; the average of the recordings showed a 22% inhibition of the response.

In the tests performed by adding previously to the organ bath 5 mcg./cc. of diethylaminoethyl flufenamate gave an average inhibition of 35%; when the amount of diethylaminoethyl flufenamate added to the bath was doubled, that is, 10 mcg./cc., the average inhibition recorded in four experiments was 54%.

These results show that the inhibitory action of diethylaminoethyl flufenamate is much more powerful than that of novocaine and, therefore, according to the teachings of Elio and Stephenson, the anaethetizing effect of the former in comparison with that of novocaine is also much greater.

We would explain that in order to obtain the above-mentioned inhibition percentages, we have taken as response unit of the frog muscle, the response given when only 5 mcg./cc. of acetylcholine had been added to the organ solution. The responses of the same muscle have been found when there was added to the solution also, novocaine, in one case and diethylaminoethyl flufenamate in the other case, according to the amounts cited for each case. Comparing these responses with the response unit, the percentage inhibitions given above have been found.

EXAMPLE VI

Itching of the skin of the neck was produced in a group of six volunteers by rubbing with dried cynarrhodium hairs. Then an ointment containing 1% of diethylaminoethyl flufenamate was applied to the irritated area. The irritation gave way completely in a few minutes, unlike the control cases treated only with the excipient of the ointment.

EXAMPLE VII

An aqueous solution of 0.5% of diethylaminoethyl flufenamate, in spray form, was applied to the pharyngeal mucous membrane of a group of six volunteers. Within a few minutes they appreciated a clear sensation of insensitivity in the treated area, without any other subjective or objective modifications in them.

EXAMPLE VIII

The following aqueous solution was prepared, containing per 100 cc.:

| | |
|---|---|
| Diethylaminoethyl flufenamate (hydrochloride) mg | 500 |
| Framicetine, 500 mg. (in sulfate form) mg | 746 |
| Sodium dexamethasone-m-sulfobenzoate mg | 3 |
| Essence of mentha mg | 275 |
| Sodium saccharine mg | 90 |
| Polysorbate 20 g | 2 |
| Alcohol 96° cc | 7 |
| Glycerine g | 50 |
| 2 N hydrochloric acid, sufficient for pH=4.3, approximately 0.3 cc. | |
| Deionized water, sufficient for 100 cc. | |

This solution is distributed in pressure resistant spray packs having a 0.1 cc. metering valve, using nitrogen as impeller gas.

This preparation is used at a dosage of from 4 to 6 spray applications daily on patients having oropharyngeal affections, with notable success.

Only as an exemplary sample, two clinical histories are resumed below relative to this use:

Patient A was treated for aphonia which, in its evolutive course, had grown until reaching its state at treatment. Inspection shows a laryngeal process of infectious nature, extending to the pharynx and isthmus of the fauces. In spite of the aphonia being perhaps the most relevant sign, it was discovered that the patient also presented discreet discomfort of a dysphagic nature. Having arrived at the diagnosis of laryngo-pharyngitis, treatment with this spray was prescribed and the discomfort disappeared rapidly.

Patient B complaining of discomfort in his neck (according to the patient), which increased at deglutition. On examination reddened tonsils and odd small disseminated points of pus were observed. The use of the spray at a recommended dosage of three applications daily was prescribed. The following day the improvement was notable and the patient's recovery was complete after 48 hours.

It is understood that the foregoing detailed descriptions are given merely by way of illustration and that many variations may be made therein without departing from the spirit of our invention.

Having described our invention, what we desire to secure by Letters Patent is:

1. A method for treating mammalian bodies afflicted with local pain which comprises applying topically to the affected sites a local anesthetic composition containing from about 0.2 to about 5% of diethylaminoethyl flufenamate or its hydrochloride.

2. A method according to claim 1, wherein said composition containing diethylaminoethyl flufenamate or its hydrochloride is applied topically to the affected site two to eight times daily.

3. A method according to claim 1 wherein the diethylaminoethyl flufenamate hydrochloride is used in an aqueous solution.

4. A method according to claim 1, wherein the diethylaminoethyl flufenamate hydrochloride is used in a composition consisting essentially of an aqueous solution containing per 100 cc.:

| | |
|---|---|
| Diethylaminoethyl flufenamate (hydrochloride) mg | 500 |
| Framicetine, 500 mg. (in sulfate form) mg | 746 |
| Sodium dexamethasone-n-sulfobenzoate mg | 3 |
| Essence of mentha mg | 275 |
| Sodium saccharine mg | 90 |
| Polysorbate 20 g | 2 |
| Alcohol 96° cc | 7 |
| Glycerine g | 50 |
| 2 N hydrochloric acid cc | 0.3 |
| Deionized water cc | 100 |

References Cited

Chem. Abst. *62*, 11742g (1965).
Chem. Abst., *60*, 13192d (1964).
Chem. Abst., *58*, 11862h (1963).

STANLEY J. FRIEDMAN, Primary Examiner